US012194326B2

(12) United States Patent
Watson

(10) Patent No.: US 12,194,326 B2
(45) Date of Patent: Jan. 14, 2025

(54) AUTOMATIC FIRE SPRINKLERS, SYSTEMS AND METHODS FOR SUPPRESSION FIRE PROTECTION OF HIGH HAZARD COMMODITIES INCLUDING COMMODITIES STORED IN RACK ARRANGEMENTS BENEATH CEILINGS OF UP TO FIFTY-FIVE FEET IN HEIGHT

(71) Applicants: Viking Group, Inc., Caledonia, MI (US); Minimax Viking Patent Management GmbH, Bad Oldesloe (DE)

(72) Inventor: Jason Thomas Watson, Hastings, MI (US)

(73) Assignees: Minimax Viking Patent Management GmbH, Bad Oldesloe (DE); Viking Group, Inc., Caledonia, MI (US)

( * ) Notice: Subject to any disclaimer, the term of this patent is extended or adjusted under 35 U.S.C. 154(b) by 0 days.

(21) Appl. No.: 17/966,207

(22) Filed: Oct. 14, 2022

(65) Prior Publication Data

US 2023/0181947 A1 Jun. 15, 2023

Related U.S. Application Data

(63) Continuation of application No. 16/989,269, filed on Aug. 10, 2020, now Pat. No. 11,583,712, which is a (Continued)

(51) Int. Cl.

*A62C 3/00* (2006.01)
*A62C 37/12* (2006.01)
*A62C 37/42* (2006.01)

(52) U.S. Cl.

CPC .............. *A62C 3/002* (2013.01); *A62C 37/12* (2013.01); *A62C 37/42* (2013.01)

(58) Field of Classification Search

CPC .......... A62C 37/12; A62C 37/42; A62C 3/002
See application file for complete search history.

(56) References Cited

U.S. PATENT DOCUMENTS

| | | | |
|---|---|---|---|
| 1,738,656 | A | 12/1929 | Lowe |
| 2,135,138 | A | 11/1938 | Clayton |

(Continued)

FOREIGN PATENT DOCUMENTS

| | | | |
|---|---|---|---|
| EP | 2 293 852 | B1 | 5/2012 |
| WO | WO2015/191619 | | 6/2015 |

OTHER PUBLICATIONS

National Fire Protection Association NFPA: NFPA 13: Standard for the Installation of Sprinkler Systems (2016 edition), NFPA 13—Sec. 5.6, Chapter 17, Sec. 3.2, 22 pages.

(Continued)

*Primary Examiner* — Joseph A Greenlund
(74) *Attorney, Agent, or Firm* — Perkins Coie LLP

(57) ABSTRACT

System and methods to provide ceiling-only suppression fire protection of up to fifty feet (50 ft.) of rack storage of cartoned unexpanded plastic commodities and less hazardous commodities, such as for example, Class 1, Class 2, Class 3, Class 4 and/or combinations thereof beneath a ceiling having a maximum ceiling height up to fifty-five feet (55 ft.). The systems and methods provide for hydraulic and system parameters that include a hydraulic design area based upon five to no more than twelve hydraulically most remote sprinklers spaced at a preferred sprinkler-to-sprinkler spacing of eight to ten feet (8-10 ft.) coupled to two to four branch lines tied to a common cross main supply pipe of firefighting fluid.

1 Claim, 8 Drawing Sheets

Related U.S. Application Data continuation of application No. 16/842,990, filed on Apr. 8, 2020, now Pat. No. 10,780,303, which is a continuation of application No. 16/570,638, filed on Sep. 13, 2019, now Pat. No. 10,661,107, which is a continuation of application No. PCT/US2019/046670, filed on Aug. 15, 2019.

(60) Provisional application No. 62/719,223, filed on Aug. 17, 2018.

(56) References Cited

U.S. PATENT DOCUMENTS 2,537,009 A 1/1951 Allen
3,195,647 A 7/1965 Campbell
3,675,952 A 7/1972 Mears
4,359,097 A 11/1982 Claussen
4,800,961 A 1/1989 Klein
4,830,116 A 5/1989 Walden
4,905,765 A 3/1990 Hein
4,987,957 A 1/1991 Galaszewski
5,366,022 A * 11/1994 Meyer .................... A62C 37/08 169/37
5,511,621 A 4/1996 Yao
5,609,211 A 3/1997 Meyer
5,829,532 A * 11/1998 Meyer .................... A62C 37/11 169/37
5,839,667 A 11/1998 Fishcer
5,865,256 A 2/1999 Pounder
5,992,532 A 11/1999 Ramsey
6,059,044 A 5/2000 Fischer
6,336,509 B1 * 1/2002 Polan ..................... A62C 37/11 169/37
6,390,203 B1 5/2002 Borisov
6,446,732 B1 9/2002 Polan
6,450,265 B1 9/2002 Ponte
6,502,643 B1 1/2003 Meyer et al.
6,585,054 B1 * 7/2003 Thomas ................. A62C 31/02 169/59
6,840,457 B2 1/2005 Park
6,868,917 B2 3/2005 Meyer et al.
7,036,603 B2 5/2006 Thomas et al.
7,165,624 B1 1/2007 Fischer
7,290,698 B2 11/2007 Thomas et al.
7,363,987 B2 4/2008 Grant
7,383,892 B2 6/2008 Jackson
7,389,824 B2 6/2008 Jackson
7,730,959 B2 6/2010 Fischer
7,735,570 B2 6/2010 Fischer
7,766,252 B2 8/2010 Jackson et al.
7,776,091 B2 8/2010 Fischer
7,793,736 B2 9/2010 Golinveaux et al.
7,798,239 B2 9/2010 Golinveaux et al.
7,819,201 B2 10/2010 Pounder et al.
7,857,069 B2 12/2010 Yu
8,074,725 B2 12/2011 Rogers
8,176,988 B2 5/2012 Fischer
8,186,448 B2 5/2012 Fischer
8,353,356 B2 1/2013 Rogers
8,353,357 B2 1/2013 Thompson
8,408,321 B2 4/2013 Golinveaux et al.
RE44,329 E 7/2013 Pounder et al.
8,485,270 B2 7/2013 Fischer
8,522,888 B2 9/2013 Pounder et al.
8,714,274 B2 5/2014 Golinveaux et al.
8,733,461 B2 5/2014 Pigeon
RE45,377 E 2/2015 Pounder et al.
9,233,266 B2 1/2016 Pounder et al.
9,320,928 B2 4/2016 Golinveaux et al.
9,381,386 B2 * 7/2016 Pigeon .................... B05B 1/267
9,457,213 B2 * 10/2016 Miller ..................... B05B 1/265
9,827,455 B1 11/2017 Tapia Negrete
10,661,107 B2 5/2020 Workman et al.
10,709,914 B1 7/2020 Workman et al.
10,729,924 B1 8/2020 Workman et al.
10,751,556 B2 8/2020 Workman et al.
10,773,110 B2 9/2020 Workman et al.
10,780,303 B2 9/2020 Workman et al.
11,583,712 B2 2/2023 Workman et al.
2005/0072580 A1 4/2005 Jackson
2005/0224238 A1 10/2005 Thomas et al.
2006/0060361 A1 * 3/2006 Pounder ................. A62C 37/14 169/37
2006/0243459 A1 11/2006 Jackson
2006/0289174 A1 12/2006 Yu
2007/0034387 A1 2/2007 Andersen et al.
2008/0053665 A1 * 3/2008 Multer ................... A62C 37/12 239/524
2008/0073008 A1 3/2008 Ide et al.
2008/0128143 A1 6/2008 Yu
2008/0257564 A1 10/2008 Cordell et al.
2008/0308285 A1 * 12/2008 Su .......................... A62C 37/11 239/522
2008/0319716 A1 * 12/2008 Golinveaux ........... A62C 35/60 703/1
2009/0126950 A1 5/2009 Rogers
2010/0263883 A1 * 10/2010 Abels ..................... A62C 31/02 169/37
2010/0276164 A1 11/2010 Feenstra
2011/0036598 A1 * 2/2011 Pahila .................... A62C 3/002 169/37
2011/0121100 A1 5/2011 Feenstra
2012/0075052 A1 * 3/2012 Heuer .................... A62C 37/14 337/298
2012/0230846 A1 9/2012 Stephens
2014/0102729 A1 * 4/2014 Ringer ................... A62C 35/68 169/17
2014/0374125 A1 12/2014 Johnson
2015/0027739 A1 * 1/2015 Multer ................... A62C 3/002 169/37
2015/0122513 A1 * 5/2015 Miller .................... A62C 35/62 169/37
2015/0246252 A1 * 9/2015 Ancone ................... B05B 1/265 169/37
2015/0265865 A1 * 9/2015 Pigeon ................... A62C 35/68 169/54
2016/0121149 A1 * 5/2016 Pena ........................ A62C 3/00 169/16
2017/0007864 A1 * 1/2017 Magnone ............... A62C 3/002
2017/0113078 A1 * 4/2017 Magnone ............... A62C 35/60
2017/0120090 A1 * 5/2017 Magnone ............... A62C 37/46
2017/0216641 A1 * 8/2017 Magnone ............... A62C 3/002
2017/0319885 A1 * 11/2017 Walker ................... A62C 37/12
2018/0015315 A1 * 1/2018 Cutting .................. A62C 35/58
2018/0304109 A1 * 10/2018 Schnell .................. A62C 37/14
2018/0318620 A1 * 11/2018 Cutting .................. A62C 31/28
2019/0099630 A1 4/2019 Pigeon
2019/0143162 A1 5/2019 Silva, Jr.
2019/0184218 A1 * 6/2019 Silva, Jr. ................ A62C 37/14
2019/0184411 A1 6/2019 Silva, Jr.
2019/0247692 A1 8/2019 Silva, Jr. et al.
2019/0275361 A1 9/2019 Wancho
2020/0129798 A1 * 4/2020 Klug ...................... A62C 37/14
2023/0181947 A1 * 6/2023 Workman .............. A62C 37/42 169/57

OTHER PUBLICATIONS

Factory Mutual Insurance Company, FM Global Property Loss Prevention Data Sheet 8-9 (Jun. 2015, Interim Rev. Jan. 2018) and (Mar. 2010, Interim Rev. Jul. 2018), 84 pages.

Underwriters Laboratories Inc. ("UL"), UL 1767 Standard for Safety Early-Suppression Fast . . . Sprinklers,Section 5—Glossary, pp. 38-64, (4th ed. 2013, rev. 2015), 36 pages.

Factory Mutual Insurance Company, "Approval Standard for Quick Response Storage Sprinklers for Fire Protection—Class No. 2008" (Feb. 2018), 87 pages.

The Viking Corporation, Data Sheet, Specific Application Esfr Pendent Sprinkler VK514 (K28.0), F_010715 2018.10.11, Rev 18.2, 5 pages.

(56) References Cited

OTHER PUBLICATIONS

Factory Mutual Insurance Company, FM Global, Letter Regarding Ceiling-Only Protection Cartioned Unexpanded Plastics in . . . Under a 50 ft Ceiling, Jan. 25, 2019, 2 pages.
Tyco Fire Products, Data Sheet Model ESFR-25 25.2 K-factor Pendent Sprinkler Early Suppression, Fast Response, TFP312, Jul. 2016, 6 pages.
The Viking Corporation, Data Sheet, Specific Application ESFR Pendent Sprinkler VK514 (K28.0), F_010715, Rev 15.1, 5 pages.
The Viking Corporation, Data Sheet, ESFR Pendent Technical Data Sprinkler VK506 (K22.4) Form No. F_081612, Rev. 18.2, 18.10.11, 5 pages.
The Viking Corporation, Data Sheet, ESFR Pendent Technical Data Sprinkler VK510 (K25.2) Form No. F_100102, 19.04.19, Rev. 19.1, 7 pages.
International Searching Authority, International Search Report and Written Opinion for International Application No. PCT/US2019/046670, Oct. 15, 2019; 19 pages.

* cited by examiner

AUTOMATIC FIRE SPRINKLERS, SYSTEMS AND METHODS FOR SUPPRESSION FIRE PROTECTION OF HIGH HAZARD COMMODITIES INCLUDING COMMODITIES STORED IN RACK ARRANGEMENTS BENEATH CEILINGS OF UP TO FIFTY-FIVE FEET IN HEIGHT

PRIORITY CLAIM & INCORPORATION BY REFERENCE

This application is a continuation of U.S. patent application Ser. No. 16/989,269, filed Aug. 10, 2020, which is a continuation of U.S. patent application Ser. No. 16/842,990, filed Apr. 8, 2020, now U.S. Pat. No. 10,780,303, granted Sep. 22, 2020, which is a continuation of U.S. patent application Ser. No. 16/570,638, filed on Sep. 13, 2019, now U.S. Pat. No. 10,661,107, granted May 26, 2020, which application is a continuation under 35 U.S.C. 120 and 365(c), and claims the benefits and priority to, International Application No. PCT/US2019/046670, filed on Aug. 15, 2019, which claims the benefit of U.S. Provisional Application No. 62/719,223 filed Aug. 17, 2018, U.S. Provisional Application No. 62/745,800 filed Oct. 15, 2018, and is a continuation of U.S. patent application Ser. No. 16/526,096 filed Jul. 30, 2019, each of which is incorporated by reference in its entirety.

TECHNICAL FIELD

The present invention generally relates to sprinklers used in automatic fire protection systems for storage buildings, warehouses and the like.

BACKGROUND ART

The design and installation of automatic fire sprinkler protection systems is dependent upon several factors including: the area to be protected, the occupants or items to be protected in the area being protected, the manner in which a fire is to be addressed. One particular area of interest is automatic fire protection systems for the protection of the following types of storage arrangements: palletized storage, solid pile storage, shelf storage, bin-box storage, or rack storage and more particularly for the protection of such storage in excess of twelve feet of height, i.e., high-piled storage. Fire protection systems for rack storage generally include a gridded arrangement of spaced apart automatic fire protection sprinklers installed above the rack storage and beneath the ceiling of the storage occupancy, i.e., ceiling-level sprinklers, which are connected to a supply of fire-fighting fluid by a network of pipes to distribute the fluid upon actuation in response to a fire. The rack storage systems can be configured with only ceiling-level sprinklers, i.e., a "ceiling-only" system or alternatively can include ceiling-level and face sprinklers installed in the rack, i.e., "in-rack" sprinklers, or along the aisle face of the storage. As used herein, "ceiling-only" fire protection is where the water or other fire suppressant is exclusively applied from ceiling-level sprinklers and therefore do not include in-rack sprinklers.

Fire protection installations are generally subject to industry accepted fire code requirements and the approval of the "authority having jurisdiction" (AHJ) to ensure compliance with the applicable codes and requirements. For example, one applicable standard is "NFPA 13: Standard for the installation of Sprinkler Systems" (2016) ("NFPA 13") from the National Fire Protection Association (NFPA). NFPA 13 provides the minimum requirements for the design and installation of automatic fire sprinkler systems based upon the area to be protected, the anticipated hazard and the type of protection performance to be provided. Another industry accepted installation standard focused on both safety and property loss is FM Global Property Loss Prevention Data Sheet 8-9 (June 2015, Interim Rev. January 2018) and (March 2010, Interim Rev. July 2018) (collectively "FM 8-9") from Factory Mutual Insurance Company of FM Global. FM 8-9 provides FM installation guidelines for the protection of Class 1, 2, 3, 4, and plastic commodities maintained in solid-piled, palletized, shelf, bin-box or rack storage arrangements.

NFPA 13 defines the performance of rack storage fire protection systems based upon the manner in which the system and its automatic fire sprinklers are designed to address a fire. For example, a system and its sprinklers can be configured to address a fire with "fire control" as defined under NFPA 13, does so by "limiting the size of a fire by distribution of water so as to decrease the heat release rate and pre-wet adjacent combustibles, while controlling ceiling gas temperatures to avoid structural damage." Systems and sprinklers can also be alternatively configured for "fire suppression" performance which is defined under NFPA 13 as "sharply reducing the heat release rate of a fire and preventing its regrowth by means of direct and sufficient application of water through the fire plume to the burning fuel surface." FM 8-9 installation guidelines are designed to provides suppression performance in rack storage protection. As used herein, "suppression mode" systems or sprinklers are defined as systems or components that sharply reduce the heat release rate of a fire and prevent its re-growth by directly and sufficiently applying water or other fire suppressant through the fire plume to the burning fuel source.

Thus, in order to satisfy the requirements for ceiling-only rack storage suppression systems, the ceiling-level sprinklers should be demonstrably capable of suppressing a fire of known size with a minimum number of sprinkler operations located at a desired ceiling-level installation height above the rack storage. Identification and qualifying of fire protection sprinklers capable of such suppression performance can be accomplished by appropriate water distribution and/or full-scale fire testing. As used herein, "qualified for suppression" means the sprinkler has been shown to satisfy full-scale fire testing showing suppression performance, satisfied appropriate water distribution testing for suppression and/or is listed by an appropriate testing agency as having satisfied suppression performance requirements. Through such testing, the system design and installation criteria for the tested sprinklers, for use in accordance with the applicable installation codes and standards, can also be identified. This design criteria can include: (i) the maximum ceiling-height for which ceiling-only protection can be provided; (ii) the hazard classifications and type of storage arrangement that can be protected at the maximum ceiling-height; (iii) the maximum height of the storage to be protected; (iv) the range of spacing between sprinklers installed at the maximum ceiling height and/or (v) the hydraulic design requirements for installing the sprinklers at the maximum height.

Accordingly, under both NFPA and FM installation guidelines, there are several design considerations in the use and installation of ceiling-level sprinklers for rack storage protection. These considerations include: the hazard type or "classification" of the stored commodity, the storage arrangement, the maximum or peak ceiling height, and the characteristics of the sprinkler to be used. Industry accepted commodity hazard classifications, including under FM 8-9 guidelines, segregate materials according to their degree of combustibility. For example, FM 8-9 lists the following commodity classifications in order from lowest hazard to highest hazard: Class 1, Class 2, Class 3, Class 4, cartoned unexpanded plastic, cartoned expanded plastic, uncartoned unexpanded plastic and uncartoned expanded plastic. Accordingly, uncartoned unexpanded and expanded plastic commodities represent the two most challenging fire hazards ("high hazard"), with uncartoned expanded plastic commodities representing the most challenging fire scenario. Under NFPA 13 guidelines, plastic commodities are classified under Group A, Group B-Class IV, or Group C-Class III plastics with Group A plastics being the most combustible or highest hazard. The Group A plastics are separately classifiable as cartoned (unexpanded or expanded) and uncartoned (unexpanded or expanded). Rack storage can have various kinds of commodity arrangements including: single row, double-row or multiple-row arrangements. Additionally, the rack arrangement can be defined by flue spaces and aisle widths between the arranged rows. In addition to the commodity classification or hazard, the rack storage fire protection system criteria under the guidelines are defined by the maximum ceiling height of the occupancy and the maximum height of the storage.

Based upon the various design considerations, the installation standards provide an indicated number of operating or design sprinklers for which a given minimum sprinkler operating pressure is to be provided for the maximum height of the storage and/or ceiling of the occupancy to be protected. The design sprinklers are an identified number of "most hydraulically remote sprinklers." As used herein the most hydraulically remote sprinklers are those sprinklers that experience the greatest fluid pressure loss relative to the fluid supply source when supplying the sprinklers with the minimum fluid flowing operating pressure for the sprinkler. Under the guidelines, the "design area" of the system is defined by the spacing of the indicated number of design sprinklers multiplied by the sprinklers' spacing or coverage requirements. Because the design area is defined by the identified most hydraulically remote sprinklers, the design area is the "most hydraulic remote area" of the system. As used herein, the most hydraulically remote area means the area that must be proven by hydraulic calculation that if all sprinklers within the design area activate, the piping and supply can provide the required operation pressure and/or fluid flow.

For example, one type of sprinkler for use as a ceiling-level rack storage protection sprinkler is the early suppression faster response (ESFR) sprinkler. NFPA guidelines generally provide that the ESFR sprinkler design areas for rack storage over 25 feet are defined by twelve (12) most hydraulically remote sprinklers, consisting of four sprinklers on each of three fluid supply branch lines. ESFR sprinklers are designed for a rapid activation. As the name indicates, the theory behind ESFR is to deliver a sufficient quantity of water during the early stages of fire development in order to suppress the fire. Thus, in order to achieve the goal of early suppression, ESFR sprinklers must quickly generate a sufficient quantity of water capable of penetrating the fire plume and thus be delivered to the core of the fire.

For a fire sprinkler system to be approved for suppression performance it is typically demonstrated to the AHJ that the system and its equipment, including its fire protection sprinklers, are suitable for suppression performance. To facilitate the AHJ approval process, fire protection equipment can be "listed," which as defined by NFPA 13, means that the equipment is included in a list by an organization that is acceptable to the AHJ and whose list states that the equipment "meets appropriate designated standards or has been tested and found suitable for a specified purpose." One such listing organization includes, Underwriters Laboratories Inc. ("UL"). UL 1767 Standard for Safety Early-Suppression Fast Response Sprinklers (4th ed. 2013, rev. 2015) from Underwriters Laboratories Inc. ("UL1767") provides the water distribution and fire test standards to establish that a sprinkler is suitable for early suppression fast response performance under applicable installation guidelines.

FM approved storage sprinklers are subject to the FM Approvals "Approval Standard for Quick Response Storage Sprinklers for Fire Protection—Class Number 2008" (February 2018) ("FM 2008") from FM Approvals LLC. FM Approved Storage Sprinklers, under FM 2008, are tested to determine suitability for a specified use, i.e., ceiling-level storage protection providing suppression performance. Like UL 1767, FM 2008 provides the water distribution and fire test standards to establish that a given sprinkler is suitable for ceiling-level suppression performance for storage protection under applicable installation guidelines.

The installation, listing and/or approval guidelines and standards require consideration of several characteristics of the sprinkler for application and compliance. Sprinkler characteristics include: the orifice size or nominal K-factor of the sprinkler, the installation orientation (pendent or upright), the thermal sensitivity or response time index (RTI) rating of the sprinkler, the sprinkler deflector details and the sprinkler spacing or coverage. Generally, automatic fire protection sprinklers include a solid metal body connected to a pressurized supply of water, and some type of deflector spaced from the outlet is used to distribute fluid discharged from the body in a defined spray distribution pattern over the protected area. The discharge or flow characteristics from the sprinkler body is defined by the internal geometry of the sprinkler including its internal passageway, inlet and outlet (the orifice). As is known in the art, the K-factor of a sprinkler is defined as $K=Q/P^{1/2}$, where Q represents the flow rate (in gallons/min GPM) of water from the outlet of the internal passage through the sprinkler body and P represents the pressure (in pounds per square inch (psi.)) of water or firefighting fluid fed into the inlet end of the internal passageway though the sprinkler body.

The spray pattern or distribution of a firefighting fluid from a sprinkler defines sprinkler performance. Several factors can influence the water distribution patterns of a sprinkler including, for example, the shape of the sprinkler frame, the sprinkler orifice size or discharge coefficient (K-factor), and the geometry of the deflector. The deflector is typically spaced from the outlet of the body. The deflector geometry is particularly significant since the deflector is the main component of the sprinkler assembly and to a great extent, defines the size, shape, uniformity, and water droplet size of the spray pattern.

To control fluid discharge from the sprinkler body is a fusible or thermally responsive trigger assembly which secures a seal over the central orifice. When the temperature surrounding the sprinkler is elevated to a pre-selected value indicative of a fire, the trigger assembly releases the seal and water flow is initiated through the sprinkler. The thermal sensitivity of the trigger assembly and sprinkler is measured or characterized by Response Time Index ("RTI"), measured in units of $(m\text{-}s)^{1/2}$. Under the FM 2008 standard, an RTI of 80 $(m\text{-}s)^{1/2}$ to 350 $(m\text{-}s)^{1/2}$ [145-635 $(ft.{*}s)^{1/2}$] defines a "Standard Response Sprinkler and an RTI equal to or less than 50 (m-s)$^{1/2}$ [90 (ft.*s)$^{1/2}$] defines a "Quick Response Sprinkler." Under the standard, a "Quick Response Sprinkler" with a nominal K-factor of 14 or larger has an RTI of 19 to 36 (m-s)$^{1/2}$ [35-65 (ft.*s)$^{1/2}$]. Under UL1767 an Early Suppression Fast Response Sprinkler has an RTI of no more than 36 (m-s)$^{1/2}$ [65 (ft.*s)$^{1/2}$].

There are generally two types of thermally responsive trigger assemblies: frangible and non-frangible. Frangible trigger assemblies generally include a liquid-filled frangible glass bulb that shatters upon reaching its rated temperature. Non-frangible trigger assemblies can include fusible links or soldered mechanical arrangements in which the components of the assembly separate upon fusion of the solder reaching its rated temperature. One type of fusible link arrangement includes a strut and a lever or multiple pin arrangement held together by a fusible link to support a sealing assembly within the discharge orifice of the sprinkler. Examples of such fusible link arrangements are shown and described in U.S. Pat. Nos. 8,353,357 and 7,766,252 and U.S. Patent Application Publication Nos. 2011/0121100 and 2005/0224238. The strut and lever are held by the fusible link in an assembled orientation which transfers a compressive force of a load member acting on the strut lever arrangement to the seal assembly. Upon fusion of the solder material and separation of the fusible link in the presence of a sufficient level of heat or fire, the lever and strut members collapse and the sprinkler is actuated with the seal released to initiate the discharge of fluid.

As ceiling heights increase and/or storage hazards extends to higher levels, fire protection from ceiling-level sprinklers only becomes more difficult to achieve and thus, the installation guidelines have limits as to "ceiling-only" storage fire protection. At higher heights there are multiple variables such as for example water supply, the orifice size and deflector details that can alter expected system performance. For example, FM 8-9 and NFPA 13 limits ceiling-only suppression performance fire protection system design guidelines to a maximum ceiling height of forty-five feet (45 ft.) in the protection of commodities classified up to class 4 and cartoned unexpanded plastics. Moreover, for pendent sprinklers beneath a ceiling height of over 30 ft., the FM 8-9 guidelines limit sprinkler linear sprinkler spacing to a range from 8 to a maximum fourteen feet (14 ft.) depending upon the responsiveness of the sprinkler. Accordingly, those of ordinary skill in the art understand that certain conditions under the installation guidelines fail to provide predictability under increasing challenging conditions, such as increased height or higher challenge commodity.

For storage occupancies having ceiling heights over 45 ft., the installation guidelines require system modifications such as for example, (i) installation of a lower "false ceiling" which effectively eliminates storage capacity under the ceiling or (ii) the use of "in-rack" sprinklers, which eliminates "ceiling-only" protection. Using in-rack sprinklers presents its own logistical constraints and/or operational drawbacks such as, for example, (i) changing or modifying the rack to install the in-rack sprinklers may require a modification of the sprinkler system; (ii) moving a rack to install in-rack sprinklers may require modifying the sprinkler system; and/or (iii) there is a risk of damaging an in-rack sprinkler occurs when loading or unloading a storage bay, in particular when employing a fork lift.

There are also known commercially available sprinklers that provide for suppression mode ceiling-only protection ceiling heights over 45 ft. with specific installation criteria not available under the general installation guidelines. For example, one known system is for rack storage of up to 43 ft. under a maximum ceiling height of 48 ft. The commercially available sprinkler and system is described in Technical Data Sheet Form No. F_010715 Rev. 18.1: Specific Application Early Suppression Fast Response (ESFR) 28.0 K-factor VK514 pendent sprinkler from The Viking Corporation of Hastings, Mich. As of January 2019, it is believed that FM has indicated approval for ceiling-only system designs for the protection of Class I-IV and cartoned unexpanded plastics single-row and double row rack storage that qualifies as open frame with aisle widths at a 6 ft. minimum beneath a maximum ceiling height of up to 50 ft. These designs using either: (i) Quick Release K25.2 Pendent Storage Sprinklers; or (ii) Quick Release K22.4 Pendent Storage Sprinklers. Examples of commercially available K25.2 and K22.4 sprinklers are described respectively in Technical Data Sheet Form No. F_0100102 (19.04.19 Rev. 19.1): ESFR Pendent Sprinkler VK510 (K25.2) and Technical Data Sheet Form No. F_081612 (18.10.11 Rev. 18.2): ESFR Pendent Sprinkler VK506 (K22.4) each of which is from The Viking Corporation of Hastings, Mich.

With businesses and building owners interested in increasing storage capacity vertically with higher ceiling and storage heights, there remains a need to identify and provide ceiling-only suppression fire protection sprinkler systems for high hazard rack storage at heights beyond those available under the known commercial systems and present installation standards. Because of limitations in current commercial systems and industry guidance, there remains a need for ceiling-only fire protection systems for rack storage of high hazards commodities under ceiling heights over 45 feet and more particularly under maximum ceiling heights of 50 ft. and over. However heretofore, in light of the various parameters to be selected from water supply, sprinkler orifice size and sprinkler deflector configuration, such systems have yet to be realized.

DISCLOSURE OF INVENTION

Preferred systems and methods are provided for suppression mode fire protection of high-piled storage at storage heights over 45 ft. that does not require in-rack sprinklers. More specifically, the preferred systems preferably provide a suppression-mode ceiling-only storage occupancy fire protection system that provides fire protection for high hazard commodities in rack storage arrangements. More particularly, the preferred embodiments of systems and methods described herein can provide ceiling-only suppression fire protection of high-piled storage that can include up to fifty feet (50 ft.) of rack storage of cartoned unexpanded plastic commodities and less hazardous commodities, such as for example, Class 1, Class 2, Class 3, Class 4 and/or combinations thereof beneath a ceiling having a maximum ceiling height up to fifty-five feet (55 ft.). Accordingly, the preferred systems and methods provide for ceiling-only suppression mode fire protection for the protection of high hazard commodities at heights not previously provided for commercially or under known industry installation standards.

One preferred embodiment of a suppression-mode ceiling-only storage occupancy fire protection system includes a grid of pendent fire protection sprinklers defining a sprinkler-to-sprinkler spacing ranging from eight feet to twelve feet (8 ft.-12 ft.) with each pendent sprinkler being qualified to suppress a fire in a storage commodity. Each sprinkler preferably includes a sprinkler body having an inlet and an outlet with a passageway disposed therebetween along a sprinkler axis and a nominal K-factor of 25.2 [GPM/(psi)$^{1/2}$] to 36.4 [GPM/(psi)$^{1/2}$], a closure assembly including a plug, a thermally responsive trigger assembly to support the closure assembly adjacent the outlet of the sprinkler body having a response time index (RTI) of 50 or less and a deflector coupled to the body and spaced from the outlet. The preferred system further includes a network of pipes with at least one main pipe and a plurality of spaced apart branch lines interconnecting and locating the grid of pendent sprinklers beneath a ceiling having a ceiling height. The network of pipes deliver to each sprinkler in a hydraulic design area a minimum flowing pressure to provide suppression protection of high-piled storage including at least one commodity including of any one of Class 1, Class 2, Class 3, Class 4/cartoned unexpanded plastic commodities and combinations thereof, stored beneath the ceiling, with the at least one commodity having a maximum storage height and a configuration of rack storage being any one of single-row, double-row, and multi-row rack storage. The number of hydraulically most remote sprinklers defining the hydraulic design area is five to no more than twelve (5-12) and the ceiling has a ceiling height of up to fifty-five feet (55 ft.) and the at least one commodity has a maximum storage height of up to fifty feet (50 ft.).

Design criteria of the preferred systems and methods described herein provide for uniquely identified hydraulic and system parameters for a system that is capable of providing ceiling-only suppression mode protection for high-piled, high hazard commodities, including those in rack storage arrangements stored to a maximum of up to fifty feet beneath a ceiling of fifty-five feet. The design criteria are preferably defined by three variables: (i) water supply; (ii) orifice size and (iii) sprinkler deflector details. Preferred systems and methods include a hydraulic design area based upon five to no more than twelve design sprinklers, spaced at a preferred sprinkler-to-sprinkler spacing of eight to ten feet (8-10 ft.), provided with a preferred minimum flowing pressure of eighty pounds per square inch (80 psi.). The number of design sprinklers defining the hydraulic design area are preferably equally divided over two or more branch lines tied to a common cross main supply pipe of firefighting fluid. Alternatively or additionally, the number of branch lines of the hydraulic design area can range from two to four branch lines.

Sprinklers for use in the preferred systems and methods have discharge characteristics defined by a nominal K-factor preferably ranging from 14.0 [GPM/(psi)$^{1/2}$] to 36.4 [GPM/(psi)$^{1/2}$] and more preferably ranging from 25.2 [GPM/(psi)$^{1/2}$] to 36.4 [GPM/(psi)$^{1/2}$]. Accordingly, for the preferred hydraulic design area, criteria and preferred five to twelve (5-12) hydraulically remote sprinklers defining the hydraulic design area of the system, a total required minimum flow or hydraulic demand for the system is preferably less than 3000 gallons per minute (GPM), more preferably less than 2500 GPM, and yet even more preferably approximately 2000 GPM.

Sprinklers of the preferred systems and methods, when appropriately hydraulically supplied, distribute the firefighting fluid for suppression performance. A preferred sprinkler for use in the systems include ESFR sprinklers having a nominal K-factor of 28.0 [GPM/(psi)$^{1/2}$] and a thermally responsive trigger assembly that includes a strut lever arrangement with a preferred fusible link with an RTI ranging from 19 to 36 (m*s)$^{1/2}$ [35-65 (ft.*s)$^{1/2}$]. The preferred sprinklers include a fluid distribution deflector having features to distribute the supplied fluid in a desired manner. In preferred embodiments of the sprinkler, the preferred fluid distribution deflector includes a perimeter centered about a central sprinkler axis with the perimeter defined by a first circle centered about the central axis and a second circle different also centered about the central axis with the second circle being different than the first circle. The first circle has a first diameter and the second circle has a second diameter less than the first diameter.

One preferred method of providing a suppression-mode ceiling-only storage occupancy fire protection system includes installing a grid of preferred pendent sprinklers in a network of pipes in which the sprinklers define a sprinkler-to-sprinkler spacing ranging from eight feet to twelve feet (8 ft.-12 ft.) within two feet of a ceiling. Each preferred sprinkler includes a sprinkler body having an orifice with an inlet and an outlet with a passageway disposed therebetween along a sprinkler axis with the orifice defining a nominal K-factor of in a range of 11 [GPM/(psi)$^{1/2}$] to 50 [GPM/(psi)$^{1/2}$], more preferably ranging from 14.0 [GPM/(psi)$^{1/2}$] to 36.4 [GPM/(psi)$^{1/2}$], a closure assembly including a plug; and a thermally rated trigger assembly to support the closure assembly adjacent the outlet of the sprinkler body with a deflector coupled to the body and spaced from the outlet. The trigger assembly has a preferred response time index (RTI) of 50 or less. The preferred method preferably includes connecting the network of pipes to a source of the firefighting fluid in which hydraulically remote sprinklers in the grid of sprinklers define a hydraulic design area of the system. The network of pipes are configured to supply each sprinkler in the hydraulic design area a minimum flowing pressure of less than one hundred per square inch (100 psi.) and/or a minimum flow of less than 2500 gallons per minute (GPM) to provide suppression protection of high-piled storage at least one commodity including of any one of Class 1, Class 2, Class 3, Class 4/cartoned unexpanded plastic commodities and combinations thereof, stored beneath a ceiling having a ceiling height. The commodity has a maximum storage height and a configuration of at least any one of single-row, double-row, and multi-row rack storage with the ceiling having a maximum ceiling height of up to fifty-five feet (55 ft.) and the storage commodity having a maximum storage height of up to fifty feet (50 ft.).

Other preferred embodiments provide for methods of supplying a suppression-mode ceiling-only storage occupancy fire protection system. One embodiment includes obtaining a plurality of preferred pendent sprinklers and providing the sprinklers for installation in a suppression-mode ceiling-only storage occupancy fire protection system that can protect high-piled storage including Class 1, Class 2, Class 3, Class 4/cartoned unexpanded plastic rack storage. Obtaining a preferred sprinkler can include any one of manufacturing or acquiring the preferred sprinklers; and providing can include any one of selling, specifying, or supplying the preferred sprinkler. The preferred method more specifically includes obtaining a plurality of preferred pendent sprinklers that include a sprinkler body having an orifice with an inlet and an outlet with a passageway disposed therebetween along a sprinkler axis with the orifice defining a nominal K-factor in a range of 11 [GPM/(psi)$^{1/2}$] to 50 [GPM/(psi)$^{1/2}$], more preferably ranging from 14.0 [GPM/(psi)$^{1/2}$] to 36.4 [GPM/(psi)$^{1/2}$], a closure assembly including a plug; a thermally rated trigger assembly to support the closure assembly adjacent the outlet of the sprinkler body with the trigger assembly having a response time index (RTI) of 50 or less and, a deflector coupled to the body and spaced from the outlet. The preferred method further includes providing the plurality of sprinklers for installation in a grid of sprinklers relative to a source of the firefighting fluid in which hydraulically remote sprinklers in the grid of sprinklers define a hydraulic design area of five to no more than ten (5-10) sprinklers to provide suppression fire protection of at least one commodity of one of Class 1, Class 2, Class 3, Class 4/cartoned unexpanded plastic and combinations thereof with a maximum storage height of up to fifty feet (50 ft.) and a configuration at least one of single-row, double-row, and multi-row rack storage. The sprinklers are provided for installation beneath a ceiling with a ceiling height being at least five (5) feet greater than the maximum storage height up to a maximum ceiling height of fifty-five feet (55 ft.).

Another preferred method of supplying a suppression-mode ceiling-only storage occupancy fire protection system includes obtaining a plurality of preferred suppression sprinklers; and providing the plurality of sprinklers for ceiling-only installation relative to a source of firefighting fluid to define a hydraulic design area of nine (9) hydraulically remote sprinklers in the protection of high-piled storage.

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1:
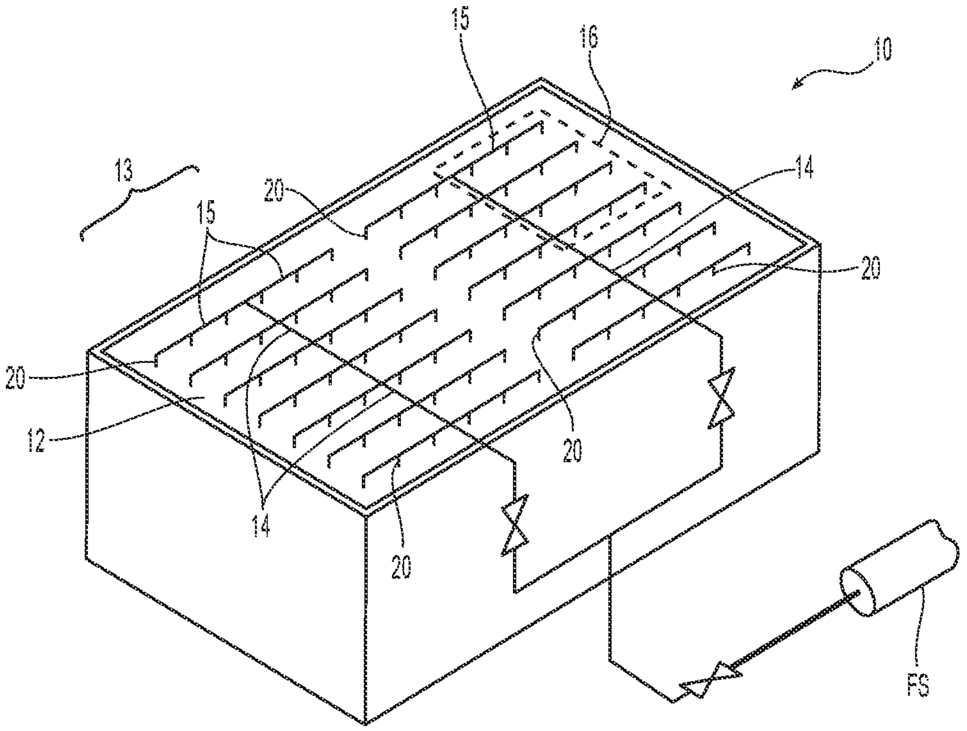
FIG. 1 is a schematic perspective view of a preferred embodiment of a storage fire protection system.
Figure 2:
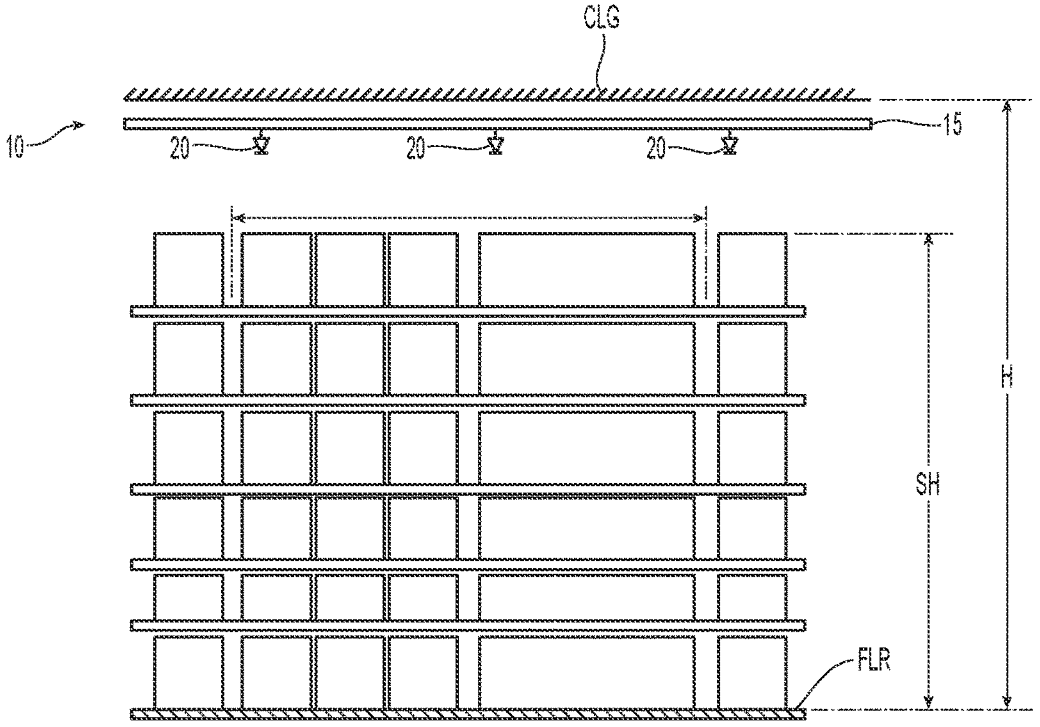
FIG. 2 is illustrative side elevation view of a storage arrangement protected by the storage fire protection system of FIG. 1.
Figure 2A:
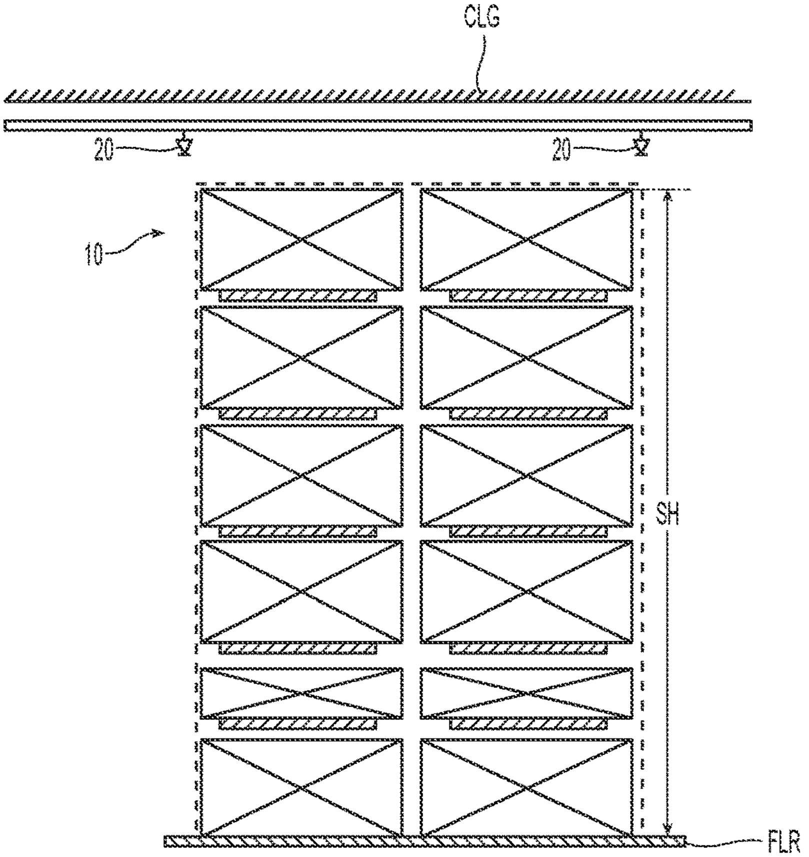
FIG. 2A is illustrative end elevation view of the storage arrangement of FIG. 2.

Shown in FIG. 1 is an illustrative schematic view of a preferred embodiment of a fire protection sprinkler system 10 for protection of a storage occupancy 12 with only ceiling-level sprinklers ("ceiling-only") to distribute firefighting fluid for addressing a fire in the occupancy. More specifically, the system 10 is preferably a suppression-mode ceiling-only storage occupancy fire protection system that provides fire protection for high-piled storage that can include high hazard commodities in a rack storage arrangement as schematically shown in FIGS. 2 and 2A. Accordingly, the preferred embodiments of systems and methods described herein can provide suppression fire protection of cartoned unexpanded plastic commodities, as defined by industry accepted standards such as FM 8-1 and NFPA 13, and less hazardous commodities, such as for example, Class 1, Class 2, Class 3, Class 4 and/or combinations thereof. As further illustrated in FIGS. 2 and 2A, the preferred embodiments of the systems and methods can provide ceiling-only suppression performance protection beneath a ceiling CLG having a maximum ceiling height H of up to fifty-five feet above a floor FLR for rack storage having a maximum storage height SH of up to fifty feet. It is believed that the present invention provides for fire protection using only ceiling-level suppression performance sprinklers for the protection of high hazard commodities at heights not previously provided for commercially or under known industry standards. FIGS. 2 and 2A illustratively show a double row rack arrangement that consists of metal rack structure with flue spaces and open shelves covered by the stored commodity. Although a double row rack arrangement is shown, it should be understood that the preferred systems described herein can be configured for protection of single row, double row or multi-row rack storage arrangements in addition to protection of non-rack arrangements such as, for example, palletized storage, solid pile storage, shelf storage, or bin-box storage.

In the illustrated embodiments, system 10 includes a grid of fire protection sprinklers 20 coupled to a network of pipes 13 that includes one or more main pipes 14 from which a plurality of spaced apart branch lines 15 extend. The main pipe 14 is connected to a source of firefighting fluid FS, such as a water supply main. The sprinklers 20 are coupled to the branch lines and spaced from one another and located relative to the fluid source. Moreover, the network of pipes locates the sprinklers 20 beneath the ceiling CLG preferably within two feet of the ceiling. The sprinklers 20 are preferably of the pendent type with its fluid deflector located arranged at a preferred distance of up to eighteen inches (18 in.) below the ceiling CLG and is even more preferably no more than fourteen inches (14 in.) below the ceiling 22. The sprinklers 20 are preferably located from one another by a sprinkler-to-sprinkler spacing which ranges from eight to as great as twelve feet (8-12 ft.).

With reference to FIG. 1, in any type of a gridded fire protection system there is a group of design sprinklers whose sprinkler-to-sprinkler spacing define a hydraulic design area 16 of the system 10. In order to place a system into service, the design sprinklers of the hydraulic design area are those sprinklers that are to be hydraulically shown to an AHJ as being be provided with at least a minimum flowing pressure to produce a minimum fluid flow for effectively addressing a fire with a desired level of protection, i.e., suppression protection. Accordingly, the sprinklers of the preferred systems have to be capable of providing the desired suppression protection and more preferably are qualified for providing suppression protection. As is described herein, preferred embodiments of the sprinkler 20 have demonstrated such capability through appropriate water distribution and fire testing.

Figure 3:
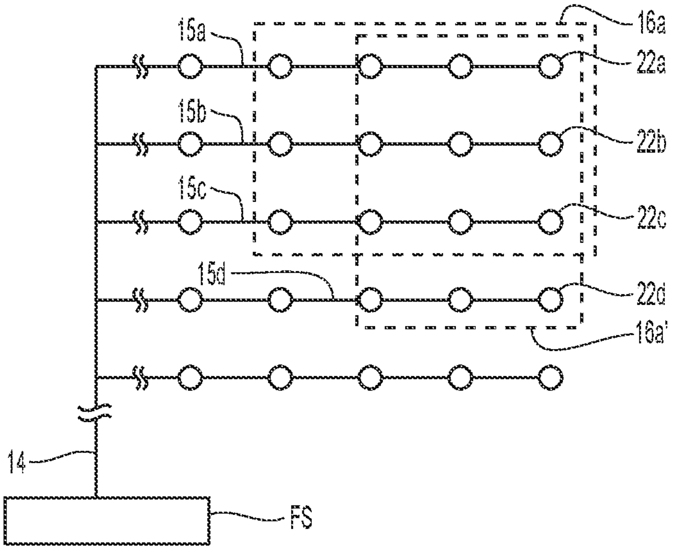
FIGS. 3-3B are schematic views of various preferred embodiments of a hydraulic design area for use in the system of FIG. 1

In the preferred system 10 and its preferred method of suppression-mode protection, the preferred sprinklers are installed in a gridded arrangement and coupled to a fluid source to implement the preferred hydraulic design. The hydraulically remote design sprinklers are each preferably provided with a minimum flowing pressure of less than one hundred pounds per square inch (100 psi.) of firefighting fluid, e.g., water. In some preferred embodiments, the minimum flowing pressure provided to the design sprinklers is eighty pounds per square inch (80 psi.). Schematically shown in FIGS. 3-3B are preferred embodiments of the hydraulic design area 16 of the system 10 defined by a preferred number of design sprinklers 22, which are hydraulically located most remotely from the fluid source FS. For each preferred hydraulic design area 16, the number of design sprinklers preferably ranges from five to twelve (5-12) and preferably less than twelve design sprinklers 22. The design sprinklers are preferably arranged or identified in groupings coupled to two or more branch pipes 15.

For example, as seen in FIG. 3, is a first preferred embodiment of the hydraulic design area 16*a* there are ten and preferably no more than twelve (10-12) most hydraulically remote sprinklers. The hydraulically remote sprinklers of the design area 16*a* are preferably divided into three groups 22*a*, 22*b*, 22*c* coupled to three branch lines 15*a*, 15*b*, 15*c*. Alternatively, the hydraulically remote sprinklers of the design area 16*a*' are preferably divided into four groups 22*a*, 22*b*, 22*c*, 22*d* coupled to four branch lines 15*a*, 15*b*, 15*c*, 15*d*. Preferably, the number of design sprinklers are equally divided among the branch lines. Alternatively, where the design sprinklers cannot be equally grouped, the largest group of sprinklers is preferably located on the most hydraulically remote branch line.

Figure 3A:
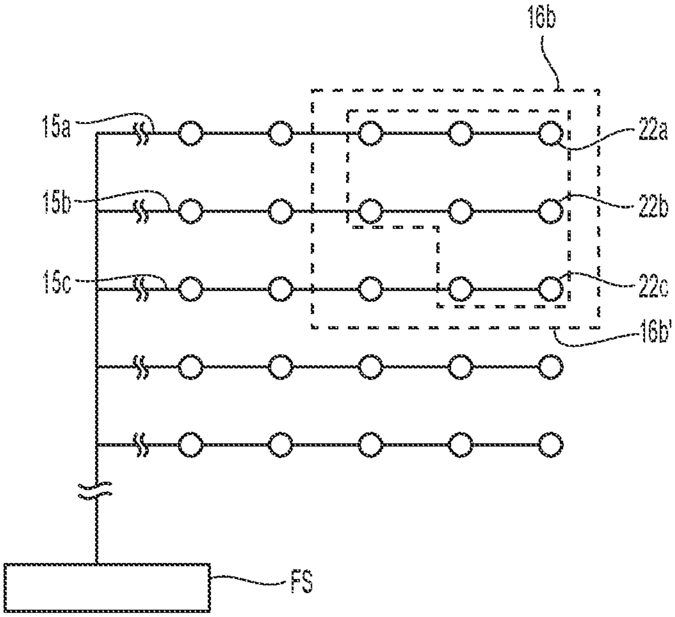
Figure 3B:
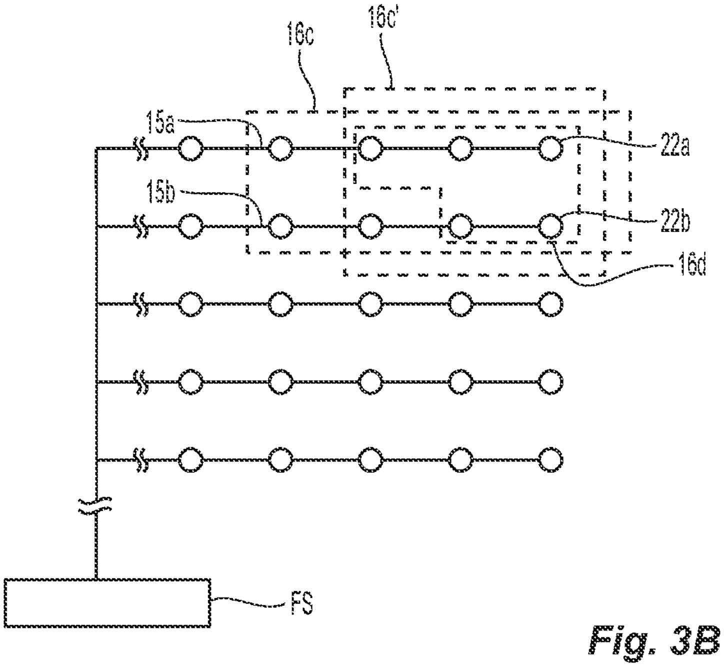

Shown in FIG. 3A, is an alternate embodiment of the hydraulic design area 16*b* in which there are five to fewer than ten hydraulically remote design sprinklers. In one preferred embodiment shown there are a total of nine (9) design sprinklers, which are preferably divided into three groups 22*a*, 22*b*, 22*c* and coupled to three branch lines 15*a*, 15*b*, 15*c*. In an alternate embodiment of the hydraulic design area 16*b*', the design area is defined by no more than eight (8) hydraulically remote sprinklers which are preferably divided into unequal groups located on three spaced apart branch lines 15*a*, 15*b*, 15*c*.

In another alternate embodiment, the hydraulic design sprinklers are located on only two spaced apart branch lines. For example, as shown in FIG. 3B, is an alternate embodiment of the hydraulic design area 16*c* in which the eight (8) hydraulically remote sprinklers which are preferably divided into two equal groups located on two spaced apart branch lines 15*a*, 15*b*. In an alternate embodiment of the hydraulic design area 16*c*', the design area is defined by a preferred six (6) hydraulically remote sprinklers which are preferably divided into equal groups located on the two branch lines 15*a*, 15*b*. The preferred ceiling-only systems described herein provide that rack storage suppression type fire protection with hydraulic design areas defined by as few as five most hydraulically remote design sprinklers. Illustrated in FIG. 3B is a preferred hydraulic design area 16*d* with no more than five design sprinklers divided into the two groups 22*a*, 22*b* preferably disposed on only two branch lines 15*a*, 15*b*.

Figure 4:
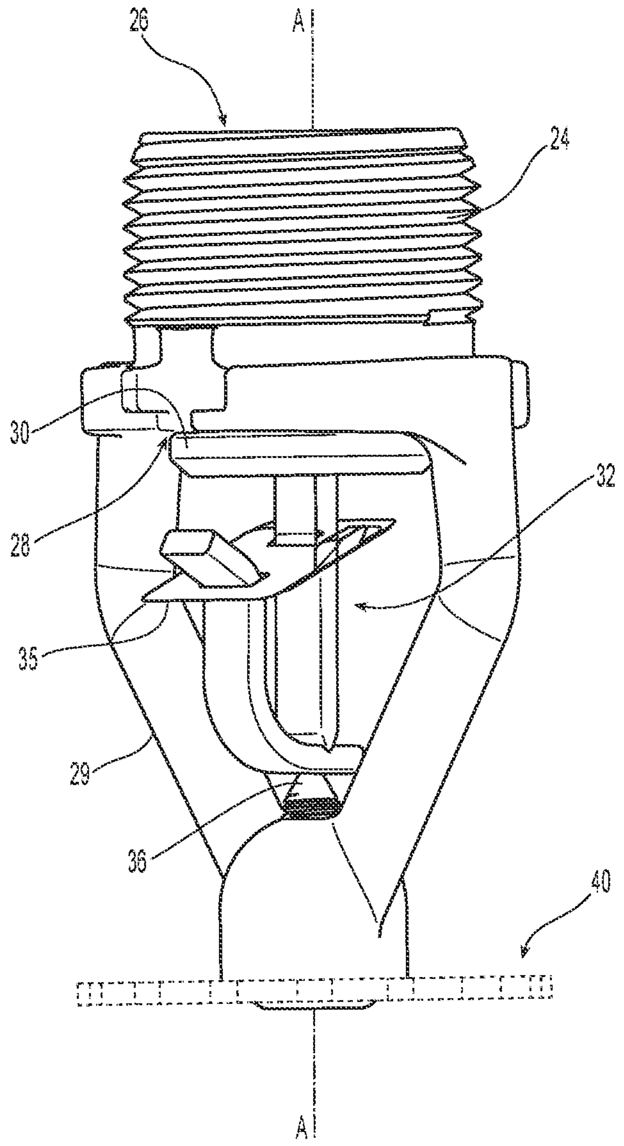
FIG. 4 is perspective illustrative view of a preferred sprinkler for use in the system of FIG. 1.
Figure 4A:
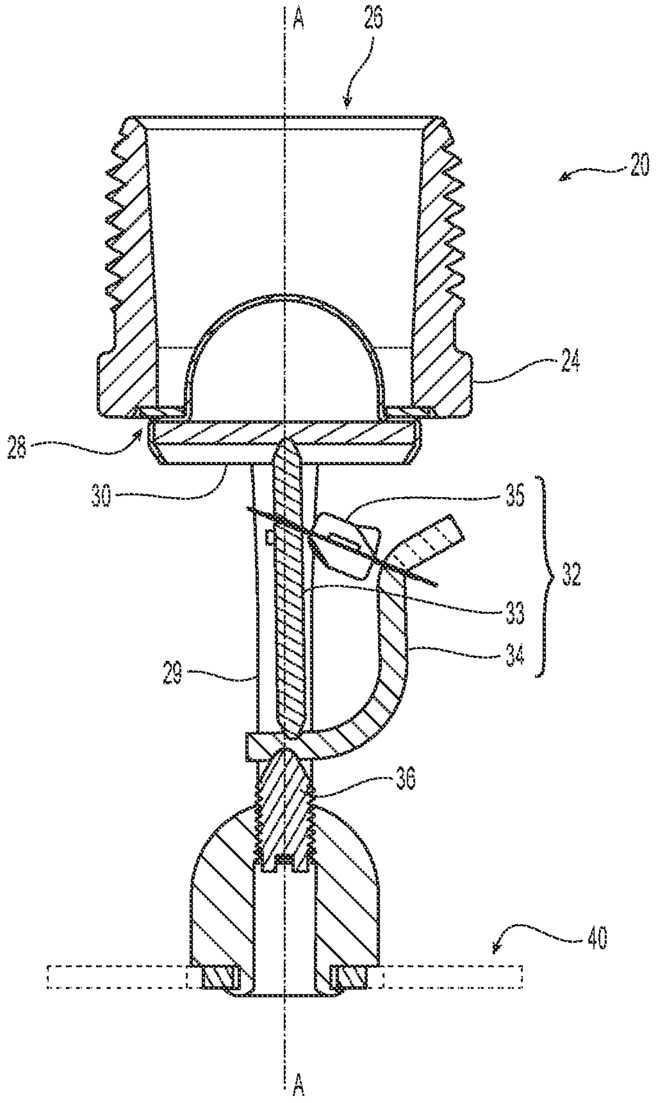
FIG. 4A is a cross-sectional view of the sprinkler of FIG. 4A.

An illustrative embodiment of a suppression fire protection sprinkler 20 for use in the system 10 is shown in FIGS. 4 and 4A. The sprinkler 20 is preferably embodied as an automatic sprinkler having a body 24 with an internal passageway having a fluid inlet 26 and an outlet 28 spaced apart from one another and axially aligned along a sprinkler axis A-A to define the sprinkler orifice and its discharge characteristics. Generally, the discharge characteristics of the sprinkler body define a preferred nominal K-factor in a range of 11 [GPM/(psi)$^{1/2}$] to 50 [GPM/(psi)$^{1/2}$] and more preferably ranging from 14.0 [GPM/(psi)$^{1/2}$] to 36.4 [GPM/(psi)$^{1/2}$] and even more particularly any one of 14.0; 16.8, 19.6; 22.4; 25.2; 28.0; 33.6 or 36.4 [GPM/(psi)$^{1/2}$]. Preferred embodiments of the sprinkler and sprinkler body for use in the system 10 define a nominal K-factor which range from 25.2 [GPM/(psi)$^{1/2}$] to 36.4 [GPM/(psi)$^{1/2}$] and are yet even more preferably any one of 25.2; 28.0; 33.6 or 36.4 [GPM/(psi)$^{1/2}$].

A closure assembly 30 and a thermally responsive or heat sensitive trigger 32 maintains the outlet 28 sealed in an unactuated state of the sprinkler. The trigger 32 can be configured as a frangible glass bulb or a fusible link arrangement. The actuation, operation or thermal responsiveness of the sprinkler to fire or sufficient level of heat is preferably faster than standard response, e.g., quick response, fast response or early fast response, with a preferred response time index (RTI) of 50 (m*s)$^{1/2}$ [100 (ft.*s)$^{1/2}$] or less, preferably no more than 36 (m*s)$^{1/2}$, [65 (ft.*s)$^{1/2}$], and even more preferably 19 to 36 (m*s)$^{1/2}$ [35-65 (ft.*s)$^{1/2}$]. Accordingly, the sprinkler 20 is preferably a quick response storage sprinkler as understood from the FM standards. The thermally responsive triggers of the sprinklers are preferably thermally rated in a range of 155° F. to 210° F. and more preferably ranges from 164° F. to 205° F. and are preferably thermally rated at 165° F.

The preferred thermally or heat responsive trigger assembly 32 is preferably disposed between the body 24 and the deflector 40 to maintain the closure assembly 30 in the outlet 28 sealed in an unactuated state of the sprinkler. As shown in FIG. 4A, the closure assembly 30 preferably includes a plug disposed in the outlet 28. The thermally responsive trigger assembly 32 preferably includes a strut 33, a lever 34 with a preferred fusible temperature-reactive link 35 coupling the strut 32 and lever 34 together in an actuatable position between the body 24 and the deflector 40 to support the closure assembly 30 within the outlet 28. The thermally responsive trigger assembly 32 transfers a compressive force of a load member 36, such as for example a threaded screw member, acting on the strut lever arrangement to the closure assembly 30. The preferred thermally responsive link 35 is preferably constructed to provide a consistent operability not available in prior fusible links. As used herein, "consistent operability" means that the fusible link is constructed to have an RTI that is within a preferred standard deviation of a preferred value such as, for example, a mean value in a preferred RTI range. The preferred RTI range can be, for example, a full range characterizing the trigger, e.g., Quick Response RTI of 19 to 36 (m-s)$^{1/2}$ or any subrange thereof. More particularly, preferred fusible links are constructed to provide for an actual RTI value that falls within a standard deviation of 6-7 of a preferred RTI mean, more preferably with a standard deviation of less than 6 of the preferred RTI mean and more preferably within a standard deviation of 2-3 of the preferred RTI mean. By providing sprinklers with the preferred fusible links of consistent operability, a plurality of sprinklers can be provided with low variance in the thermal sensitivity and/or operational characteristics between sprinklers.

Generally, the preferred fusible link 35 includes a first plate member and a second plate member joined to one another by a solder joint. Each plate member is preferably formed from beryllium nickel, such as for example, UNS-N03360 beryllium nickel. Alternatively, the plates may be formed from aluminum, steel, or copper, for example, or any other metallic material. A preferred applied solder is a eutectic solder to define a preferred temperature rating of 165° F. (74° C.) or 205° F. (96° C.) or alternatively a non-eutectic solder is applied for defining a preferred temperature rating of 161° F. (72° C.). In order to ensure a preferred adherence of the finishing coat to the soldered plates, the surfaces of the soldered elements are prepared with a surface treatment or preparation sufficient to sufficiently adhere a protective or finishing coating. Preferred embodiments of the link assembly 35 include one or more finishing coatings of an enamel paint. U.S. Provisional Application No. 62/745,800 is incorporated herein by reference as showing and describing a preferred embodiment of the fusible link 35 and its assembly.

Figure 5:
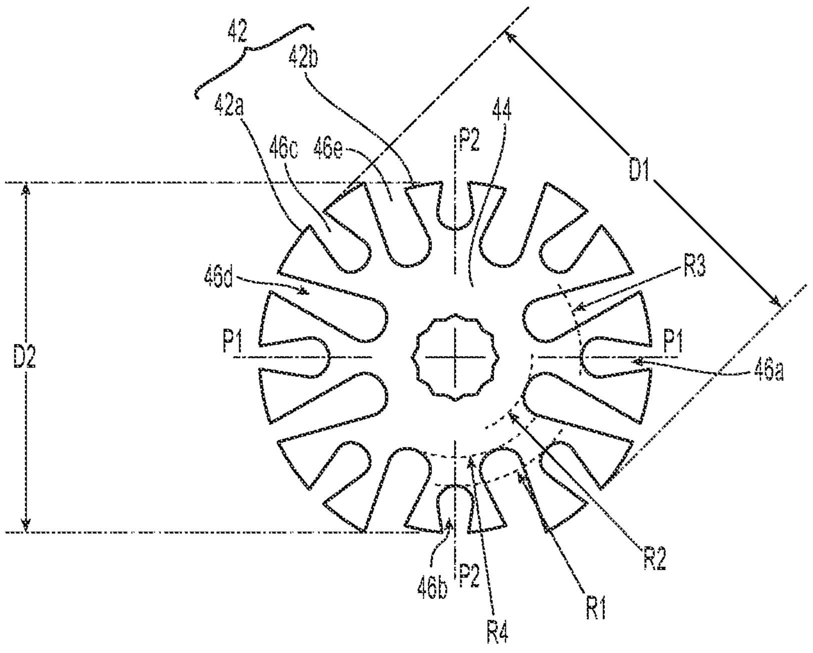
FIG. 5 is a preferred fluid deflector for use in the sprinkler of FIG. 4.

Referring again to FIGS. 4 and 4A, a preferred embodiment of the suppression sprinkler 20 includes a nominal K-factor of 28.0 [GPM/(psi)$^{1/2}$], a thermal sensitivity defined by an RTI of 50 (m*s)$^{1/2}$ [100 (ft.*s)$^{1/2}$] or less and a deflector 40. A preferred sprinkler is shown and described in U.S. Patent Application No. 62/745,800, which is incorporated by reference in its entirety. The sprinkler 20 is preferably configured for installation in a pendent type orientation with the fluid distribution deflector 40 coupled to the body 24 of the sprinkler 20 and spaced from the outlet 28 at fixed distance by a pair of frame arms 29. The distribution of fluid discharged from the sprinkler body defines a preferred spray pattern and coverage of the sprinkler which defines the preferred sprinkler spacing of the sprinkler. As previously noted, the sprinklers of the system 10 preferably define a preferred sprinkler-to-sprinkler spacing of eight to twelve feet (8-12 ft.) and more preferably a sprinkler-to-sprinkler spacing of eight to ten feet (8-10 ft.). A preferred sprinkler fluid distribution deflector 40 is shown in FIG. 5 centered along the sprinkler axis A-A. The preferred deflector 40 has a perimeter 42 and a central portion 44 with the deflector including a plurality of spaced apart tines defining a plurality of opposed slot pairs 46*a*, 46*b*, 46*c*, 46*d*, and 46*e* slot between adjacent tines. Each slot has a first width at the perimeter 42 of the deflector and radiused portion between the first width and the central portion 44 of the deflector. The spaced apart terminal ends of each tine define the perimeter 42. The perimeter 42 preferably includes a first perimeter 42*a* on a first circle concentric to the sprinkler axis defining a first diameter D1. The perimeter 42 includes a second perimeter portion 42*b* on a second circle concentric to the sprinkler axis defining a second diameter D2 less than the first diameter D1. Accordingly, there are at least a first plurality of tines located on or terminating at the first circle and at least a second plurality of tines located on or terminating at the second circle. Notably, for at least one pair of opposed slots 46*e*, the tine on one side of the slot terminates at the first circle and the tine on the other side of the slot terminates on the second circle. In a preferred embodiment, the diameters define a preferred first-to-second diameter ratio that ranges from 1.1:1 to 1.2:1. In an alternate embodiment, the tines can terminate on or define different perimeter geometries for example different first and second rectangles to provide a perimeter of varying the widths.

The five different opposed slot pairs 46*a*, 46*b*, 46*c*, 46*d*, and 46*e* are differentiated by their location and geometry including their radial lengths and widths. The first group of opposed slot pairs 46*a* includes a first opposed pair that terminate at the first circle and aligned along a first bisecting plane P1. The second group of opposed slot pairs 46*b* includes a first opposed pair that terminate at the second circle and aligned along a second bisecting plane P2. In the sprinkler assembly, the second group of opposed slot pairs 46*b* and the second bisecting plane P2 are preferably aligned with the frame arms 25. The third group of slots 46*c* is preferably disposed between the first and second group of opposed pair of slots 46*a*, 46*b* and preferably equiangularly disposed between the first and second group of opposed pair of slots 46*a*, 46*b*. Accordingly, the third group of slots 46*c* preferably include two pairs of opposed slots disposed at a 45 degree angle between the first and second bisecting planes. In another preferred aspect, a fourth group of opposed slot pairs 42*d* is preferably disposed between the first and third group of slots 42*a*, 42*c*. A fifth group of opposed slot pairs 46*e* is preferably disposed between the second and third group of slots 42*b*, 42*c*.

As shown the shortest slots are the second opposed pair 46*b* with the longest opposed pair being the fourth opposed pair 46*d*. In defining the slot lengths of the various slot groups, the radiused portions of each slot is tangent to a concentric circle circumscribed about the center C. Each of the second and third group of slots 46*b*, 46*c* are tangent to circle having a first radius R1 about the deflector center that is the largest for all slot groups and the fifth group of slots 46*e* is tangent to a circle having a second radius R2 about the deflector center that is the smallest for all slot groups. The radius portions of the first and fourth slots are preferably tangent to different circles having respective radii R3, R4 between the largest and smallest concentric circles. The terminal widths of three slot groups 46*a*, 46*c* and 46*d* are the same at the perimeter of the deflector. Each of the second and fifth slot groups 46*b*, 46*e* are different from one another and the other three slot groups.

Further variations in the slot features or variations in the combination of like slot features can define alternate embodiments of the deflector that are suitable for providing a suppression-like spray pattern for use in the system 10. For example, all the slot groups can have a common slot width at the perimeter with the second group of slots 46*b* being the longest slots and the fifth group of slots being the shortest. To vary the lengths of the slots, the concentric circles can define alternative radii from the deflector center to which one or more radiused slot portions run tangent.

As described above, the total fluid flow from a sprinkler is a function of the discharge coefficient and fluid pressure provided to the sprinkler. The fluid flow from the sprinkler in combination with the spray pattern defined by the deflector 40 can define the performance for the preferred ceiling-level sprinkler over a range of heights and commodities. The inventors have discovered a preferred range of fluid pressure for operation of the preferred sprinkler 20 to produce suppression performance in addressing a fire size indicative of a high hazard commodity fire from a vertical distance of fifty-five feet. Thus, the inventors have discovered the operational combination of sprinkler and minimum operating pressure for use in the system 10 for the protection of high hazard commodities in rack storage beneath a ceiling that of up to fifty-five feet (55 ft.) in height and lower. The preferred fluid pressure is less than 100 psi., preferably ranging from 35-100 psi., more preferably ranging from 50-100 psi., even more preferably ranging from 60-100 psi., yet even more preferably ranging from 75-100 psi. and is more preferably 80 psi. For the design sprinklers and design areas of the previously described ceiling-only systems that are provided within the preferred range, a minimum volume of fluid flows therefrom which defines the preferred hydraulic demand of the ceiling-only systems to deliver suppression protection beneath a peak ceiling height of fifty-five feet (55 ft.). Thus, for the preferred five to twelve (5-12) hydraulically remote sprinklers defining the hydraulic design area of the system, the total required minimum flow is preferably less than 3000 gallons per minute (GPM), more preferably less than 2500 GPM, and yet even more preferably approximately 2000 GPM.

Figure 6:
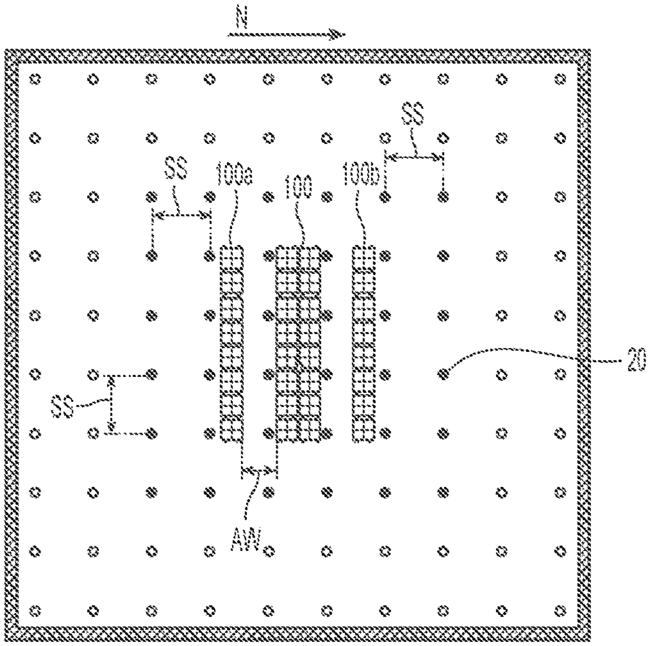
FIGS. 6, 6A, and 6B are schematic views of a full-scale fire test setup for a sprinkler for use in the system of FIG. 1.
Figure 6A:
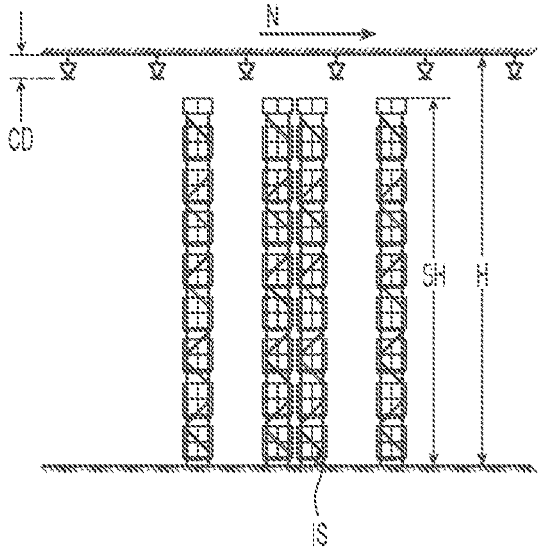
Figure 6B:
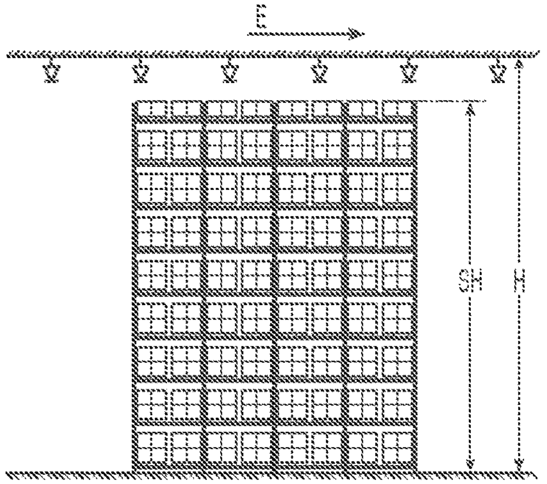

Preferred embodiments of the sprinkler are qualified for suppression. The preferred embodiments haven subjected to full scale fire tests were conducted under the worst-case scenario for which the preferred systems are to be used. Shown in FIGS. 6, 6A and 6B are illustrative schematics of a fire-test set up for use in three full-scale fire tests. Installed beneath a ceiling located fifty-five feet (55 ft.) above the floor are a grid of thirty-six (36) of the preferred K 28.0 suppression pendent-type sprinklers at a linear sprinkler spacing at one of an 8 ft.×8 ft. spacing or a 10 ft.×10 ft. spacing. The sprinklers were supplied with the preferred 80 psi. of fluid pressure through a looped piping system of 2½ inch diameter branch lines to provide for a preferred discharge flow rate of 250 GPM from any actuated sprinkler. The sprinklers were located beneath the ceiling with their deflectors at a ceiling-to-deflector distance that ranges from 1-2 ft.

Located below the sprinkler grid is the test commodity of cartoned unexpanded plastic commodity preferably embodied as single wall corrugated cardboard cartons measuring a nominal 21 in.×21 in.×20 in. containing 125 crystalline polystyrene empty 16. oz. cups in separate compartments within the carton. Each pallet load is supported by a two-way 42 in.×42 in.×5 in. slatted deck hardwood pallet. A main array 100 of industrialized racks is arranged as a double-row rack arrangement of the test commodity having a storage height of forty-five to fifty feet (45-50 ft.) with 36 in. wide rack members. The double-row main rack array 100 includes four 8 ft. across with 9-10 tiers. For the fire tests, the geometric center of the main array 100 is centered between four central sprinklers or alternatively centered between two central sprinklers.

Two target arrays 100*a*, 100*b* of stored commodity forty-five to fifty feet (45-50 ft.) in height are disposed to each side of the main array 100 to define an aisle width of four to eight feet (4-8 ft.). Each target array 100*a*, 100*b* is a single row measures 4 ft. across with 9-10 tiers. The target arrays 100*a*, 100*b* were spaced about the main array to define an aisle width that ranged from 4-8 ft. Three to four fire tests were conducted with a single fire located and ignited at the floor. In each test, the fire was located at a preferred off-set distance of two feet (2 ft.) east of the centroid of the double row rack main array. In one test, the test fire is located between two sprinklers, in another test the test fire is located between four sprinklers and in the remaining test, the test fire is centered beneath a single sprinkler.

For each test following ignition of the test fire, the total number of sprinkler activations was counted and the time of each sprinkler activation was recorded. Additionally, the maximum 1-minute average gas temperature above the ignition site and the maximum 1-minute average steel temperature above the ignition site was determined using appropriate sensors. At the conclusion of each fire test, the damage to the main array and target arrays, if any, is evaluated. From the test results, the performance of the sprinkler under the worst-case scenarios is determined.

In each of the fire test, no more than five sprinklers operated. The maximum 1-minute average gas temperature above the ignition site was no more than 1000° F. and the maximum 1-minute average steel temperature above the ignition site remained below 200° F. In each test, the fire remained contained to the main array and did not spread to the ends of the main array. Accordingly, in each of the fire tests, the fire never crossed the aisle to impact the target array. Based upon the test results, the preferred test sprinklers, when supplied with the minimum fluid pressure of 80 psi., can qualify for suppression performance sufficient to protect cartoned unexpanded plastic or lesser hazards in a rack storage arrangement to a storage height of fifty feet beneath a maximum ceiling height of 55 ft. The test results thereby support the preferred hydraulic design criteria for ceiling-only protection previously described and shown in FIGS. 3, 3A and 3B. In particular, a ceiling-only system using the preferred sprinklers can provide for suppression performance based upon at least five design sprinklers being provided with a minimum fluid pressure of 80 psi. Moreover, by applying a safety factor of no more than 2.4, the desired suppression performance can be realized with no more than twelve (12) sprinklers.

Figure 7:
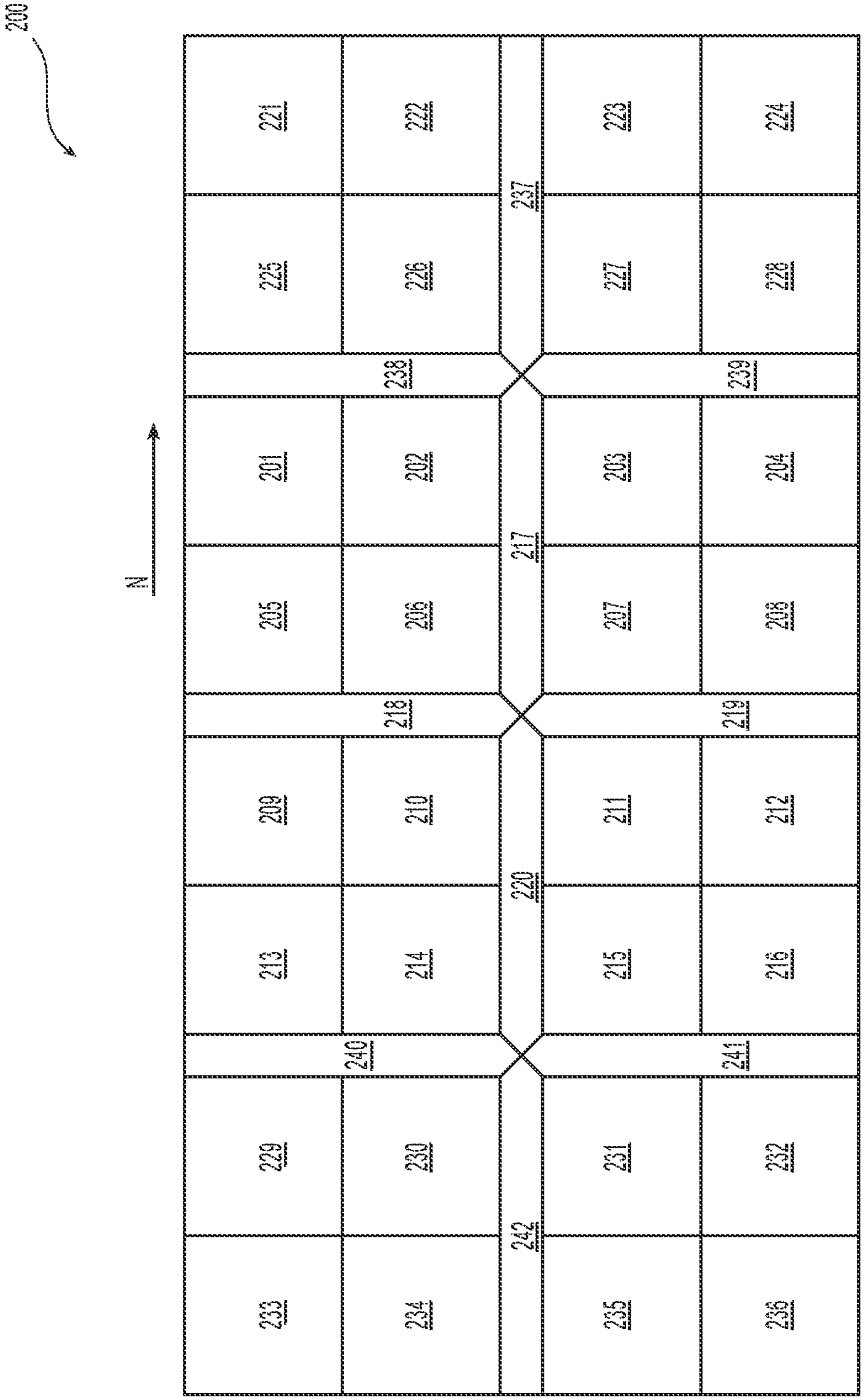
FIG. 7 is a schematic view of a collection pan array for testing a sprinkler for use in the system of FIG. 1.

Preferred embodiments of the sprinkler were subjected to actual delivery density (ADD) testing. Shown in FIG. 7 is a forty-two collection pan set up over which two or more of the preferred sprinklers were installed and coupled to a fluid source. A series of tests were conducted in which water was distributed from the one or more sprinklers into the collection pans. From the collected volume, the actual delivered density ADD was determined for each pan. Collection pans were grouped together according to their pan location and the density values summarized. The collection pans were grouped as follows: (i) four center core pan groups (201, 202,205,206); (203,204,207,208); (209,210, 213,214); (211, 212,215,216); (ii) four flue pans (217, 218, 219, 220) which are centered between the four center core pans; (iii) eleven north pre-wetting pans (221, 222, 225, 226); (223, 224, 227, 228); (237, 238, 239); and (iii) eleven south pre-wetting pans (221, 222, 225, 226); (231, 232, 235, 236); (240, 241, 242). In one embodiment, the center core pans are centered beneath two sprinklers spaced apart at ten feet (10 ft.). In another embodiment, the center core pans are centered beneath four sprinklers with two sprinklers spaced apart by ten feet on a first pipe line and a two sprinklers spaced apart by ten feet on a second pipe line spaced at ten feet from the first pipe. Additional details of the ADD test are described below. ADD tests were conducted without a fire and also conducted in the presence of a fire of a known size. In order to compare the ADD, a known burning fuel package can be ignited beneath the collection pans for which the required discharge density RDD is known for suppressing the fire. If the ADD from the thermally actuated sprinkler(s) rapidly extinguishes the fire, the ADD can be concluded to have exceeded the RDD of the fire to verify that the sprinklers provides suppression performance.

In one preferred set up, the collection pans were located six feet beneath a ceiling with two open sprinklers located such that the deflector was about 17 inches below the ceiling. Water was delivered to the sprinklers at 80 psi. and discharged from the open sprinklers for 8-15 minutes and no fuel package was burned. Three test runs were conducted. The ADD results were summarized as follows:

Test 1

| | Center Core Pans | Central Flue Pans | North Pre-Wetting Pans | South Pre-Wetting Pans |
|---|---|---|---|---|
| Average ADD (GPM/SQ. FT.) | 1.085 | 2.193 | 0.186 | 0.252 |

Test 2

| | Center Core Pans | Central Flue Pans | North Pre-Wetting Pans | South Pre-Wetting Pans |
|---|---|---|---|---|
| Average ADD (GPM/SQ. FT.) | 1.135 | 2.115 | 0.199 | 0.271 |

Test 3

| | Center Core Pans | Central Flue Pans | North Pre-Wetting Pans | South Pre-Wetting Pans |
|---|---|---|---|---|
| Average ADD (GPM/SQ. FT.) | 1.079 | 3.029 | 0.231 | 0.281 |

In another preferred set up, the collection pans were located six feet beneath a ceiling with four open sprinklers located such that the deflector was about 17 inches below the ceiling. Water was delivered to the sprinklers at 80 psi. and discharged from the open sprinklers for 8-15 minutes and no fuel package was burned. Two test runs were conducted. The ADD results were summarized as follows:

Test 4

| | Center Core Pans | Central Flue Pans | North Pre-Wetting Pans | South Pre-Wetting Pans |
|---|---|---|---|---|
| Average ADD (GPM/SQ. FT.) | 0.872 | 1.021 | 1.804 | 1.989 |

Test 5

| | Center Core Pans | Central Flue Pans | North Pre-Wetting Pans | South Pre-Wetting Pans |
|---|---|---|---|---|
| Average ADD (GPM/SQ. FT.) | 0.845 | 1.108 | 1.821 | 1.962 |

Test 6

| | Center Core Pans | Central Flue Pans | North Pre-Wetting Pans | South Pre-Wetting Pans |
|---|---|---|---|---|
| Average ADD (GPM/SQ. FT.) | 0.887 | 1.036 | 1.755 | 2.053 |

In another preferred ADD test, the collection pans were located six feet beneath a ceiling with two sprinklers located such that the deflector was about 17 inches below the ceiling and a 2600 kW heptane fire ignited beneath the collection pans. Water was delivered to the sprinklers at 80 psi. and discharged from the thermally actuated sprinkler for 8-12. Three test runs were conducted. The ADD results were summarized as follows:

Test 7

| | Center Core Pans | Central Flue Pans | North Pre-Wetting Pans | South Pre-Wetting Pans |
|---|---|---|---|---|
| Average ADD (GPM/SQ. FT.) | 1.09 | 2.98 | 0.387 | 0.436 |

Test 8

| | Center Core Pans | Central Flue Pans | North Pre-Wetting Pans | South Pre-Wetting Pans |
|---|---|---|---|---|
| Average ADD (GPM/SQ. FT.) | 1.094 | 2.983 | 0.38 | 0.452 |

Test 9

| | Center Core Pans | Central Flue Pans | North Pre-Wetting Pans | South Pre-Wetting Pans |
|---|---|---|---|---|
| Average ADD (GPM/SQ. FT.) | 1.089 | 3.361 | 0.494 | 0.435 |

In another ADD test with burning fuel, the collection pans were located six feet beneath a ceiling with four sprinklers located such that the deflector was about 17 inches below the ceiling and a 3000 kW heptane fire ignited beneath the collection pans. Water was delivered to the sprinklers at 80 psi. and discharged from the thermally actuated sprinkler for 7-15 minutes. Four test runs were conducted. The ADD results were summarized as follows:

Test 10

| | Center Core Pans | Central Flue Pans | North Pre-Wetting Pans | South Pre-Wetting Pans |
|---|---|---|---|---|
| Average ADD (GPM/SQ. FT.) | 0.838 | 1.06 | 1.984 | 2.099 |

Test 11

| | Center Core Pans | Central Flue Pans | North Pre-Wetting Pans | South Pre-Wetting Pans |
|---|---|---|---|---|
| Average ADD (GPM/SQ. FT.) | 0.872 | 1.025 | 1.917 | 2.042 |

Test 12

| | Center Core Pans | Central Flue Pans | North Pre-Wetting Pans | South Pre-Wetting Pans |
|---|---|---|---|---|
| Average ADD (GPM/SQ. FT.) | 0.86 | 1.101 | 1.757 | 2.019 |

Test 13

| | Center Core Pans | Central Flue Pans | North Pre-Wetting Pans | South Pre-Wetting Pans |
|---|---|---|---|---|
| Average ADD (GPM/SQ. FT.) | 0.9 | 1.122 | 1.909 | 1.974 |

In each of the distribution tests in the presence of a test fire, the fire was extinguished within a test duration ranging from 5-10 minutes. It was therefore concluded that the test sprinklers demonstrably provided an ADD greater than the required delivery density (RDD) necessary to suppress the test fire.

Having identified and verified a preferred sprinkler, its minimum operating pressure and associated hydraulic design criteria for protection of high-piled, high hazard commodities beneath a peak ceiling height of up to fifty-five feet (55 ft.), a method of obtaining and providing a sprinkler of high hazard commodities for ceiling and storage heights under 55 ft. are provided. Obtaining a preferred sprinkler can include any one of manufacturing or acquiring the preferred sprinklers; and providing can include any one of selling, specifying, or supplying the preferred sprinkler. For example, one preferred method of supplying a suppression-mode ceiling-only storage occupancy fire protection system includes obtaining a plurality of pendent sprinklers. Each sprinkler preferably including: a sprinkler body defining a nominal K-factor of any one of 28.0 and 36.4, a closure assembly and a thermally rated trigger assembly having a response time index (RTI) of 50 $(m^*s)^{1/2}$ [100 $(ft.^*s)^{1/2}$] or less, preferably no more than 36 $(m^*s)^{1/2}$, [65 $(ft.^*s)^{1/2}$], and even more preferably 19 to 36 $(m^*s)^{1/2}$ [35-65 $(ft.^*s)^{1/2}$]. The preferred method also preferably includes providing the plurality of sprinklers for installation in a grid of sprinklers in which hydraulically remote sprinklers in the grid of sprinklers define a hydraulic design area of the system of five to no more than ten (5-10) sprinklers to provide a suppression fire protection of at least one commodity of one of Class 1, Class 2, Class 3, Class 4/cartoned unexpanded plastic and combinations thereof. In the preferred method, the sprinklers are preferably installed beneath a ceiling having a maximum ceiling height of fifty-five feet (55 ft.) with the stored commodity having a maximum storage height of up to fifty feet (50 ft.) in a rack storage arrangement being any one of single-row, double-row, and multi-row rack storage to define a clearance distance between the commodity and the ceiling of at least five feet (5 ft.).

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A plurality of Quick Response Storage Sprinklers for ceiling-only fire protection of a storage commodity consisting of cartoned unexpanded plastic commodities stored beneath a ceiling having a ceiling height up to fifty-five feet in a storage commodity consisting of rack storage, each of the plurality of Quick Response Storage Sprinklers, comprising:

a sprinkler body having an inlet and an outlet with a passageway disposed therebetween along a sprinkler axis and a nominal K-factor of 22.4 [GPM/(psi) ½] to 36.4[GPM/(psi) 1/2]; a closure assembly including a plug; a deflector coupled to the sprinkler body and spaced from the outlet via a pair of frame arms, each of the pair of frame arms including lateral surfaces being symmetric about a plane that bisects the deflector; and a thermally responsive trigger assembly to support the closure assembly, the thermally responsive trigger assembly including a strut lever arrangement with a fusible link;

wherein each fusible link of each of the plurality of Quick Response Storage Sprinklers has a surface treatment to adhere a coating and a response time index (RTI) of 65 $(ft.^*s)^{1/2}$ or less, and wherein the RTI of each fusible link being within a standard deviation value of 2-3 of a mean RTI value of the plurality of Quick Response Storage Sprinklers.

* * * * *